No. 778,095. PATENTED DEC. 20, 1904.
E. L. ARTHUR.
TREE HOLDING DEVICE.
APPLICATION FILED AUG. 27, 1904.
NO MODEL.
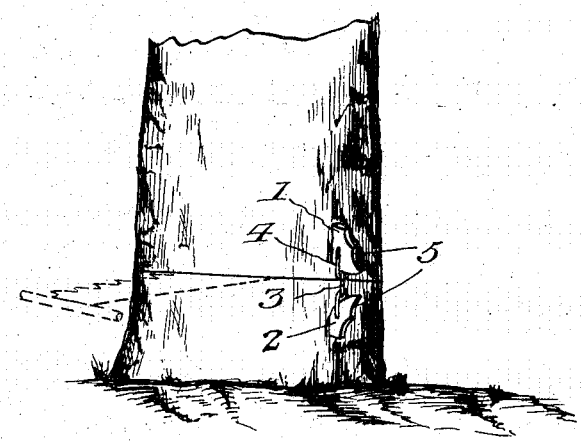
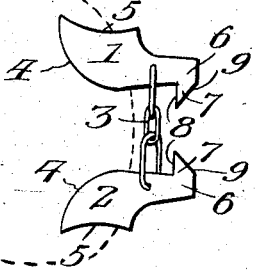
Witnesses
Phil E. Barnes
W H Clarke
Inventor
E. L. Arthur,
By Victor J. Evans
Attorney No. 778,095. Patented December 20, 1904.

UNITED STATES PATENT OFFICE.

ERNEST L. ARTHUR, OF MARSHES, WEST VIRGINIA.

TREE-HOLDING DEVICE.

SPECIFICATION forming part of Letters Patent No. 778,095, dated December 20, 1904.

Application filed August 27, 1904. Serial No. 222,456.

*To all whom it may concern:*

Be it known that I, ERNEST L. ARTHUR, a citizen of the United States, residing at Marshes, in the county of Raleigh and State of West Virginia, have invented new and useful Improvements in Tree-Holding Devices, of which the following is a specification.

This invention relates to a tree-holding device.

In timber districts where it is customary to fell trees by sawing through the trunk close to the ground it is found by experience that the trees when partially cut through have a tendency to fall, thus causing the trunk to split longitudinally and a portion thereof to remain upon the stump in a shattered or splintered condition. For this reason it is necessary frequently to saw the log again above the split portion in order to secure a clean cut end.

One object of this invention is to prevent a tree from falling during the sawing operation until it shall have been so nearly cut through that when permitted to fall the splitting of the trunk will be either entirely avoided or else reduced to a minimum.

Furthermore, it is well known that while a tree is being cut the trunk has a tendency to settle upon the saw, retarding its free movement.

A further object of the invention is to prevent this settling of the tree upon the saw.

With the foregoing and other minor objects in view, which will appear as the description proceeds, the invention resides in a tree-holding device comprising a pair of combined wedge and hook members connected by suitable link means, one of said members being adapted to be driven into the tree-trunk above the plane on which the cut is made and the other into the stump below said cut. The wedge portions of the device are adapted to be driven into the cut to prevent the trunk from settling upon the saw. It will be understood that two of the improved devices may be used at the same time, one for holding the tree and the other for spreading the cut.

The invention also resides in the particular combination and arrangement of parts and in the precise details of construction hereinafter described and claimed as a practical embodiment of the invention.

In the accompanying drawings, forming part of this specification, Figure 1 is a perspective view of a tree, showing the manner of using the improved device to hold the tree against premature falling. Fig. 2 is a plan view showing the manner of using the improved device as a wedging means.

As shown in the drawings, the device preferably comprises a pair of combined hook and wedge members 1 2, connected together preferably by means of a link 3. Each of the members preferably consists of an approximately simitar-shaped wedge-blade having a convex penetrating edge 4, a concaved thickened rear edge 5, and a head 6, formed with a hook 7, having a straight edge 8 and an inclined edge 9.

In using the improved device of this invention to hold a tree against premature falling the saw is started into the tree, as indicated by the dotted lines in Fig. 1, and the device is applied by driving the hook portion of one of the members into the tree-trunk above the cut and the hook portion of the other into the stump below the cut, whereby the tree is prevented from falling until it has been nearly cut through, after which the upper penetrating member is knocked or withdrawn from the trunk and the tree is permitted to fall.

In using the improved device as a wedge means to prevent the tree from settling upon the saw the wedge portions of the members are driven into the cut by delivering blows from a mallet upon the concaved thickened edge 5.

It will be understood that two of the improved devices may be used at the same time by driving the two wedge members of one device into the cut and by driving the hook members of another device into the trunk and stump of the tree. The devices can be withdrawn from the tree by striking them loose with a mallet or other suitable implement.

Changes in the precise embodiment of invention illustrated and described may be made within the scope of the following claims without departing from the spirit of the invention or sacrificing any of its advantages.

Having thus described the invention, what is claimed is—

1. A device of the character specified comprising a pair of combined wedge and hook members, and a flexible element connecting said members.

2. A device of the character specified, comprising a pair of members, each having a blade at one end and a hook at the other, and link means connecting said members.

3. A tree-holding device comprising a pair of members, each having a simitar-shaped blade, and a head formed with a hook having a straight edge and an inclined edge, and link means connecting the members.

In testimony whereof I affix my signature in presence of two witnesses.

ERNEST L. ARTHUR.

Witnesses:
J. HUGH MILLER,
P. J. OVERTON.